United States Patent [19]

Wakelin

[11] Patent Number: 4,798,284

[45] Date of Patent: Jan. 17, 1989

[54] BOX FOR STORING THIN OBJECTS

[76] Inventor: Thomas C. V. Wakelin, Bramcote, 1 Norris Close, Whitehill, Bordon, Hampshire GU35 9EG, United Kingdom

[21] Appl. No.: 58,193

[22] Filed: Jun. 4, 1987

[30] Foreign Application Priority Data

Jun. 5, 1986 [GB] United Kingdom ............... 8613705
Jun. 5, 1986 [GB] United Kingdom ............... 8613706
Jun. 5, 1986 [GB] United Kingdom ............... 8613707
Nov. 4, 1986 [GB] United Kingdom ............... 8626348

[51] Int. Cl.⁴ .................................................. B65D 85/57
[52] U.S. Cl. .................................. 206/45.15; 206/309; 206/444; 220/22.1
[58] Field of Search ............... 206/44 B, 44 R, 45.13, 206/45.18, 45.15, 425, 444; 312/9, 10, 185; 220/22, 22.1, 22.2, 22.3; 211/11, 51

[56] References Cited

U.S. PATENT DOCUMENTS

| | | | |
|---|---|---|---|
| 2,281,464 | 4/1942 | Straubel | 220/22.3 |
| 2,781,125 | 2/1957 | Mills | 220/22.3 |
| 3,881,597 | 5/1975 | Dahl, Jr. | 206/44 B |
| 4,325,595 | 4/1982 | Solomon | 206/45.18 |
| 4,366,904 | 1/1983 | Roskvist | 206/44 B |
| 4,666,036 | 5/1987 | Bourbon | 206/45.18 |
| 4,693,364 | 9/1987 | Wakelin | 206/45.18 |

Primary Examiner—Jimmy G. Foster
Attorney, Agent, or Firm—Mattern, Ware, Stoltz & Fressola

[57] ABSTRACT

A box for storing thin slightly compressible objects, in particular floppy disks, has an inner part and an outer part. In an open position of the box, the inner part is substantially upright for support of the disks in a position for selection of one of them. The inner part has a foot member beneath the disks and a stem member behind the disks. A movable member is pivoted at pins to the inner part at a position spaced above the foot. This member has a lower portion beneath the pivot pins and an upper portion thereabove. On movement of the upper portion away from the stem member, the lower portion moves crosswise of the foot and compresses the disks locally between itself and the stem which acts as a reaction member. This action causes the disks to fan out above the pivot pins for selection among them. The upper portion of the movable member restrains the disks from falling forwards out of the box.

23 Claims, 8 Drawing Sheets

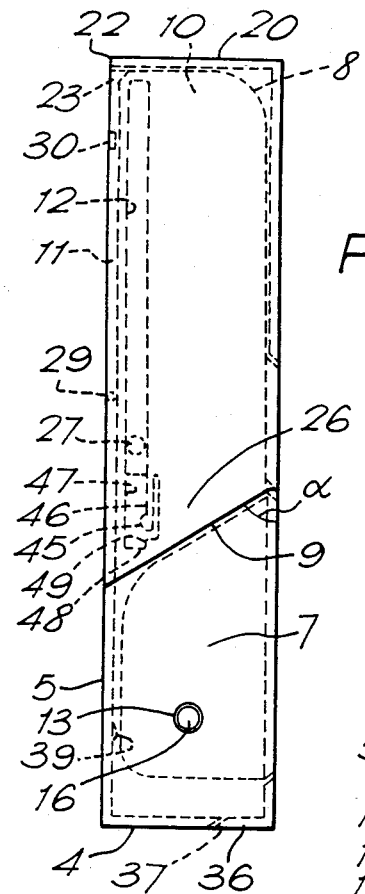
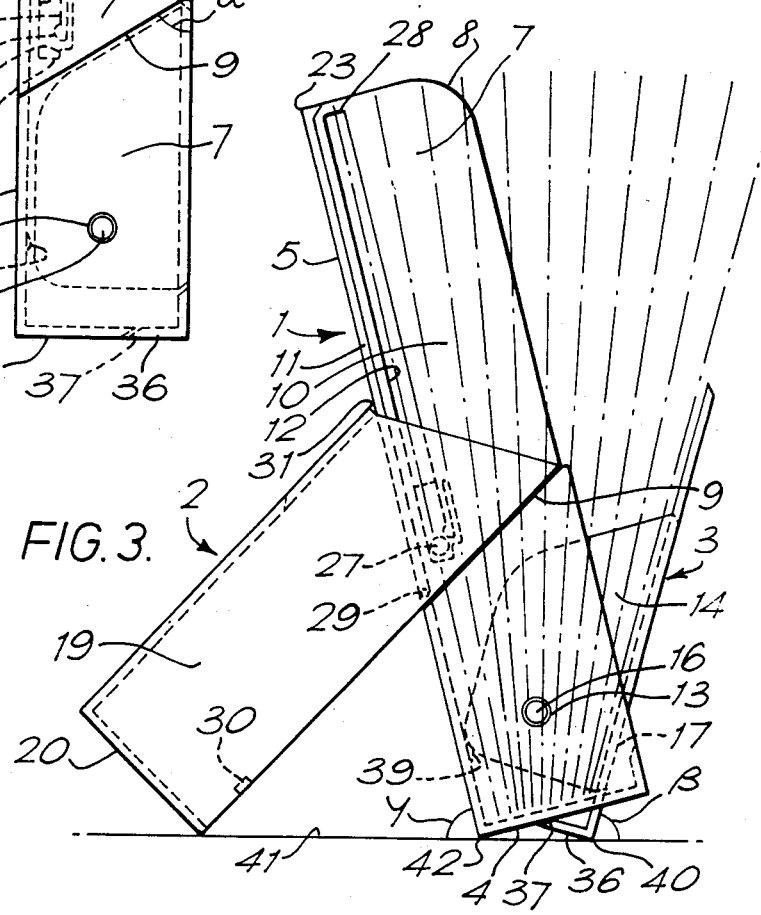
FIG. 2.
FIG. 3.

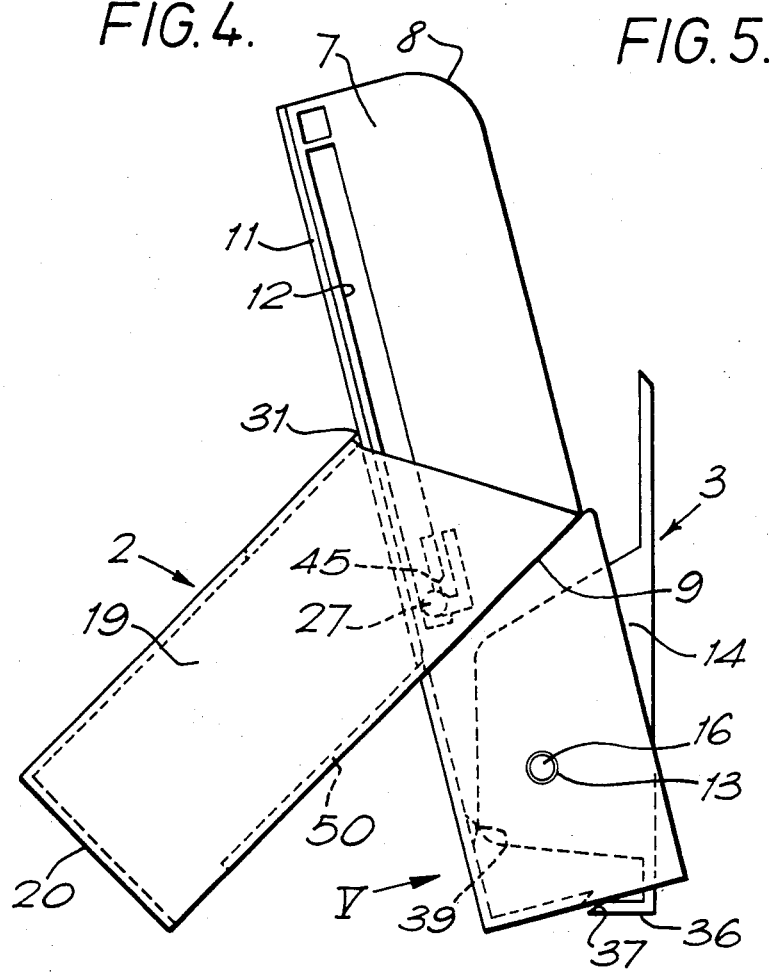
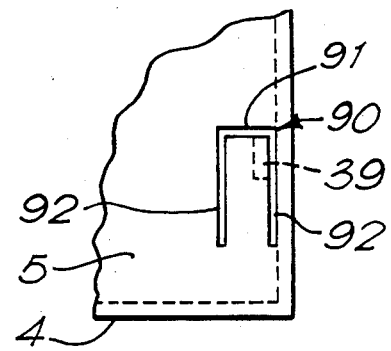
FIG. 4.
FIG. 5.

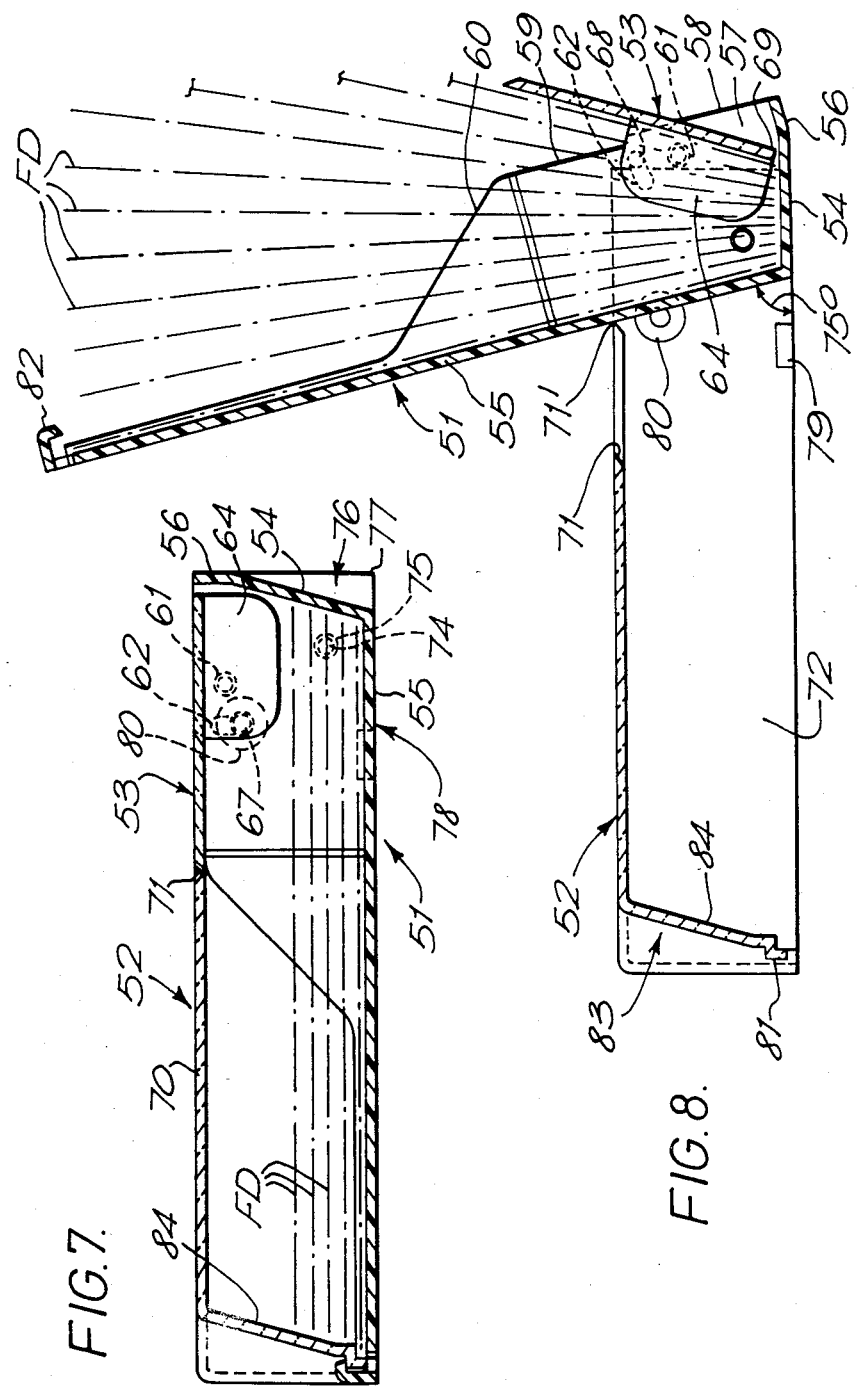

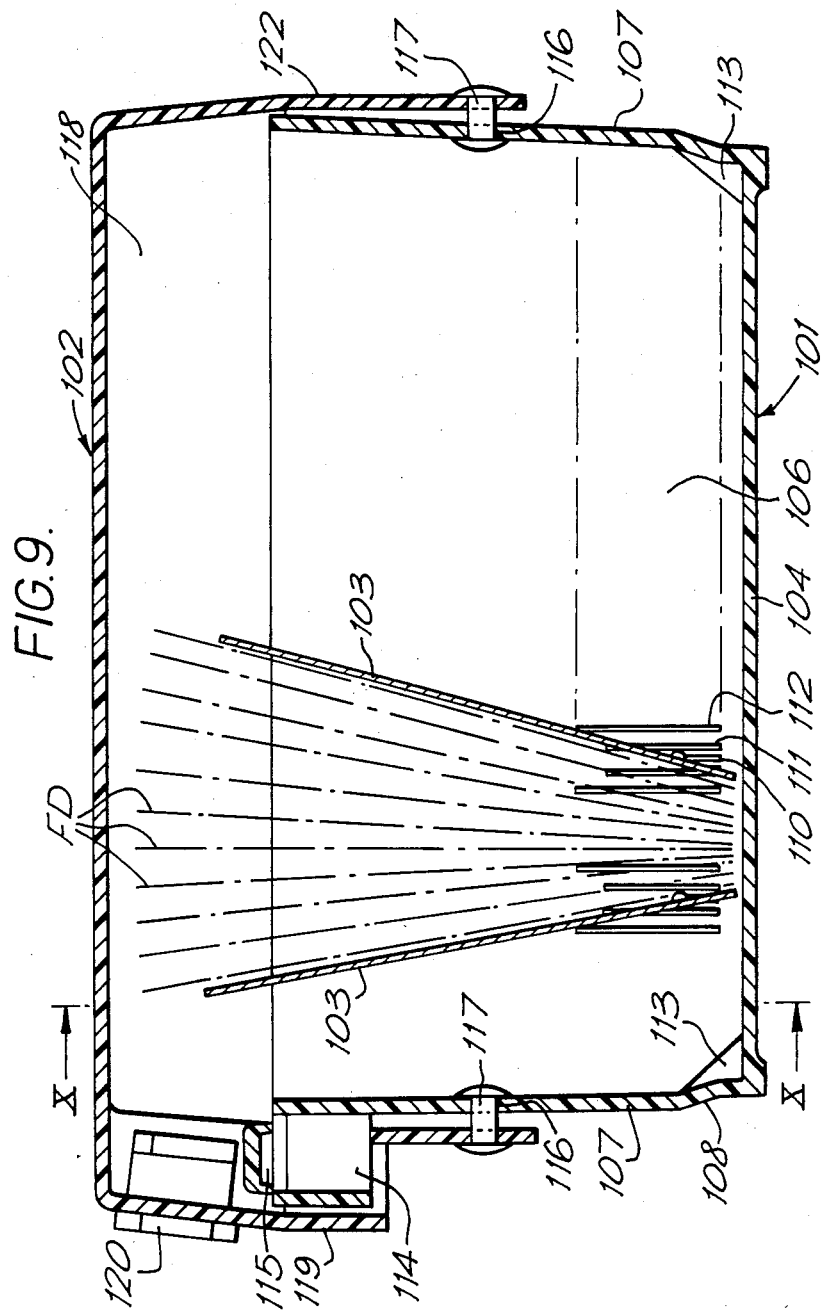

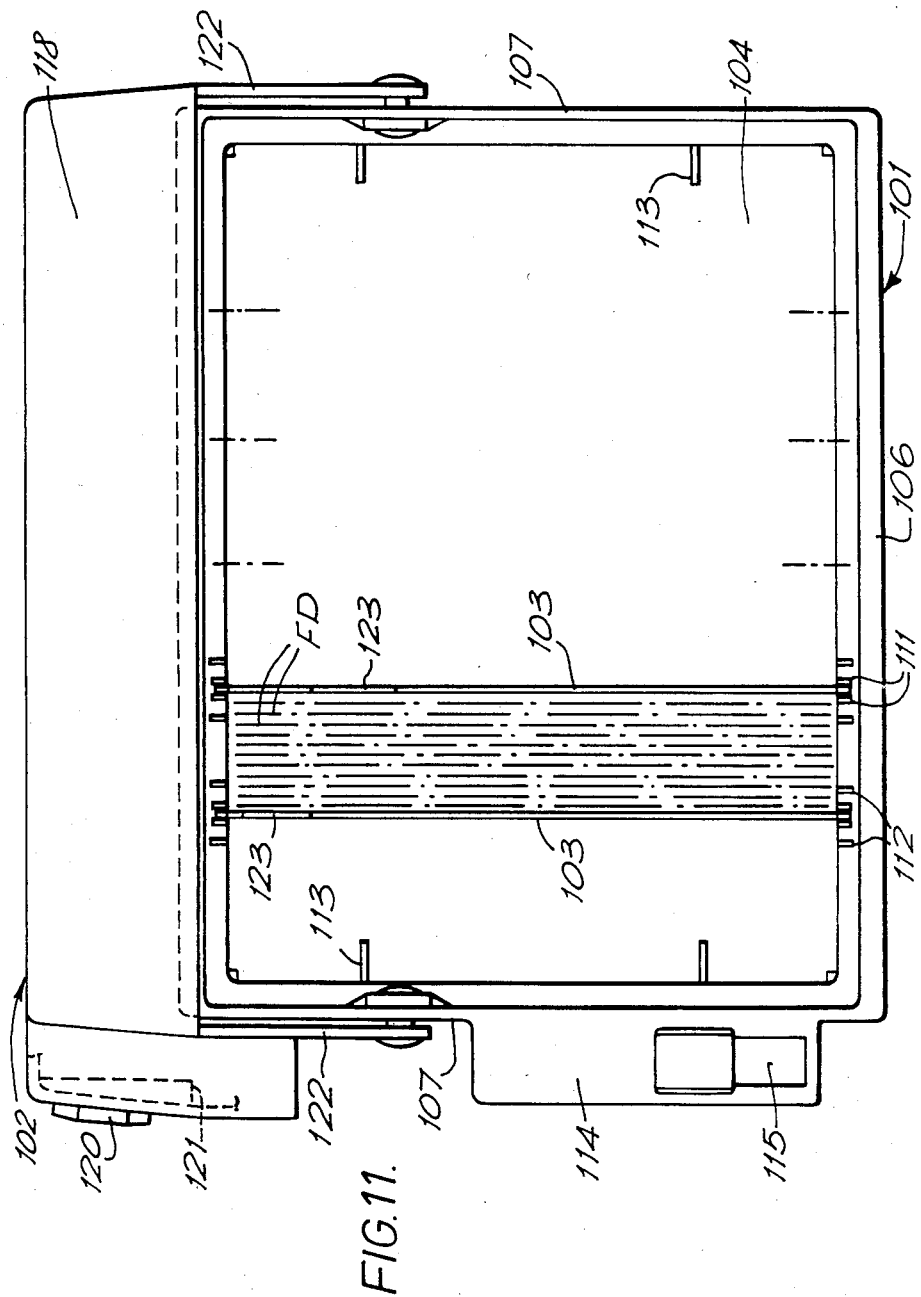

BOX FOR STORING THIN OBJECTS

FIELD OF THE INVENTION

The present invention relates to a box for storing thin objects.

Certain thin objects, including so-called "floppy disks", require sorting when stored in a box to enable a selected one of them to be found and withdrawn from the box for use. For such sorting it is advantageous if the box provides space for the objects to be fanned out, so that an individual object can be separated from its neighbors for inspection prior to selection. Usually it is not necessary for the entire object to be inspected; information for selection of it can be provided at an upper portion of it, which can be separated from the upper portion of its neighbors and the object's lower portion can remain relatively tightly packed together. This is the normal arrangement for a card index box for instance.

BACKGROUND OF THE INVENTION

Thus, in U.S. Pat. No. 4,356,918 issued on 2nd Nov. 1982 to Memorex Corporation, there is disclosed a disk storage container having a base section and a pouch section adapted to fit into the base section in a closed position and to rotate about an axis such that in an open position, the pouch section rests against the base section with its rear wall at a small angle to the vertical. The pouch section has a partial front wall adapted to pivot about an axis and away from the rear wall to enlarge the pouch section. The stack of disks stored in the container rests against the rear wall of the pouch section in the open position. Separation of the individual disks is entirely a manual operation.

Another disk storage container is disclosed in my United Kingdom patent application No. 2,140,781 published on 5th Dec., 1984 and its divisional No. 2,174,075 published on 29th Oct., 1986 and both granted on 1st Apr., 1987 and in my equivalent U.S. patent application No. 613,155, filed 23rd May 1985, which issued as U.S. Pat. No. 4,634,001 on 6th Jan. 1987, and continuation U.S. patent application No. 910,502 filed on 23rd Sept. 1986, and in my European Patent Application No. 0127974. The container therein disclosed includes an outer part and a drawer - or inner part - adapted to fit in the outer part in a closed position and to withdraw, rotate about an axis and move into an open position to rest against the outer part with its rear wall at an angle to the vertical. The rear wall acts as a rest for a stack of disks in the drawer which has a front restraining member to restrain disks from falling forwards out of the box. The restraining member is adapted to pivot about an axis and away from the rear wall to enlarge the space available in the drawer for the disks. Again separation of the individual disks is entirely a manual operation.

The Invention

The present invention owes its conception to the realisation that certain objects, in particular if tapered and/or resilient in a lower portion, will fan out if a stack of them, in which the objects are individually arranged to be substantially upright, is compressed at the level of their lower portions.

The object of the present invention is to provide a box in which objects can be caused to fan out in this manner.

According to the invention, a box for storing thin objects having means for supporting a stack of the objects in a substantially upright position for selection amongst them, the support means including a support surface disposed beneath the objects at least when the stack is arranged substantially upright, comprises means for compressing the stack of thin objects at the level of their lower portions to cause them to fan out at their upper portions, the compression means including a movable member spaced from and movable crosswise of the support surface to bear at one side of the stack against an outside one of the stack of objects for compression of them and a reaction member positioned to bear at the other side of the stack against an outside one of the stack of objects for reacting the compression of the objects caused on movement of the movable member.

Preferably, the movable member is pivotally arranged in the box for its compression-causing movement.

Preferably, the compression means is so arranged that the stack of objects is restrained without further compression at a level intermediate the upper and lower portions of the thin objects to provide a fulcrum level about which the objects fan out.

Conveniently, where the movable member is pivotally arranged in the box, its pivot axis is arranged at the fulcrum level whereby the movable member provides such restraint without further compression of the objects at this level.

Preferably, the box includes an inner part connected to an outer part which covers the objects in a closed position and supports the inner part at a leaning back inclination in an open position.

The inner part is preferably generally L-shaped in lateral cross-section. In its open position supporting the floppy disks for selection, the foot of the L provides the support surface whilst the stem of the L provides the reaction member, which is substantially upright in this position. It should be noted that for the purposes of the present invention, the term "substantially upright" includes within its scope inclinations such as the normal inclination of the reaction member, namely 15° to the vertical. The term is used herein to have the opposite meaning to "lain down". Such inclination allows the support member to abut a support surface such as a table top.

Conveniently, the inner part has side members and the movable member has side wings. The inner part and the movable member are pivotally connected at the side members of the inner part and the side wings of the movable member by pivot pins defining an axis spaced above the support surface in a front portion of the inner part. Pivotal limitation means is also preferably provided for limiting forward pivotal movement of the movable member to a compression position.

Conveniently, the outer part has a cover panel which—in the closed position—is co-planar with the movable member and abuts it at edges which are preferably chamfered.

Preferably the movable member with its wings co-operates with the inner part in an over-centre manner on movement to its compressing position.

In the first preferred embodiment described below, which is intended for 5¼" floppy disks, the two parts of the box are preferably connected by engagement means so as to allow the inner part to be at least partially withdrawn from the outer part to a position whence the inner part can be swung through an angle of less than 180 degrees with respect to the outer part for movement into a self-supporting, open position, in which a rear lower edge of the outer part and a front lower edge of the inner part can abut a supporting surface.

Preferably the axis of pivotal connection of the movable member to the inner part is so positioned that a forwards edge of the movable member abuts the flat surface, when the movable member is moved to its disks compressing position, for steadying of the box against tipping forward under the weight of the fanned out disks.

Preferably, the cover panel and the movable member are formed with co-operating catch formations.

In the second preferred embodiment the inner and outer parts are pivotally connected together at a position close to the front of the inner part so that the outer part can be swung through just more than 270° with respect to the inner part from a position covering the inner part to a position extending behind the inner part for the support of it in its leaning back open position. The inner part is in effect a tray. Whilst the outer part is a cover for the tray.

In the third preferred embodiment, which is for a large number of floppy disks the reaction members are preferably provided both as a part of the box which is fixed with respect to a part providing the support surface, and as other movable members. Whilst it is envisaged that a box may be provided with two such movable members and a single stack of thin objects therebetween; where two such members are provided there would, in addition, normally be two fixed reaction members between which the movable members are arranged. This arrangement provides for three stacks of thin objects separated by the movable members. In the third preferred embodiment five movable members are provided with six stacks of thin objects.

To help understanding of the invention, specific embodiments thereof will now be described by way of example and with reference to the accompanying drawings.

THE DRAWINGS

FIG. 2 is a side view of the box of FIG. 1;

FIG. 3 is a view similar to FIG. 2 of the box in its open position;

FIG. 4 is a view similar to FIG. 3 of a modification of the first embodiment of the box in a partially open position;

FIG. 5 is a scrap view of a bottom corner of the box of FIG. 4 from the rear in the direction of arrow V;

FIG. 7 is a cross-sectional view on line VII—VII in FIG. 4;

FIG. 8 is a view similar to FIG. 7 of the box in its open position;

FIG. 9 is a cross-sectional side view of a third embodiment of a box according to the invention on line IX—IX FIG. 10;

FIG. 11 is a plan view of the box of FIG. 9 when open; and

THE FIRST PREFERRED EMBODIMENT

Figure 1:
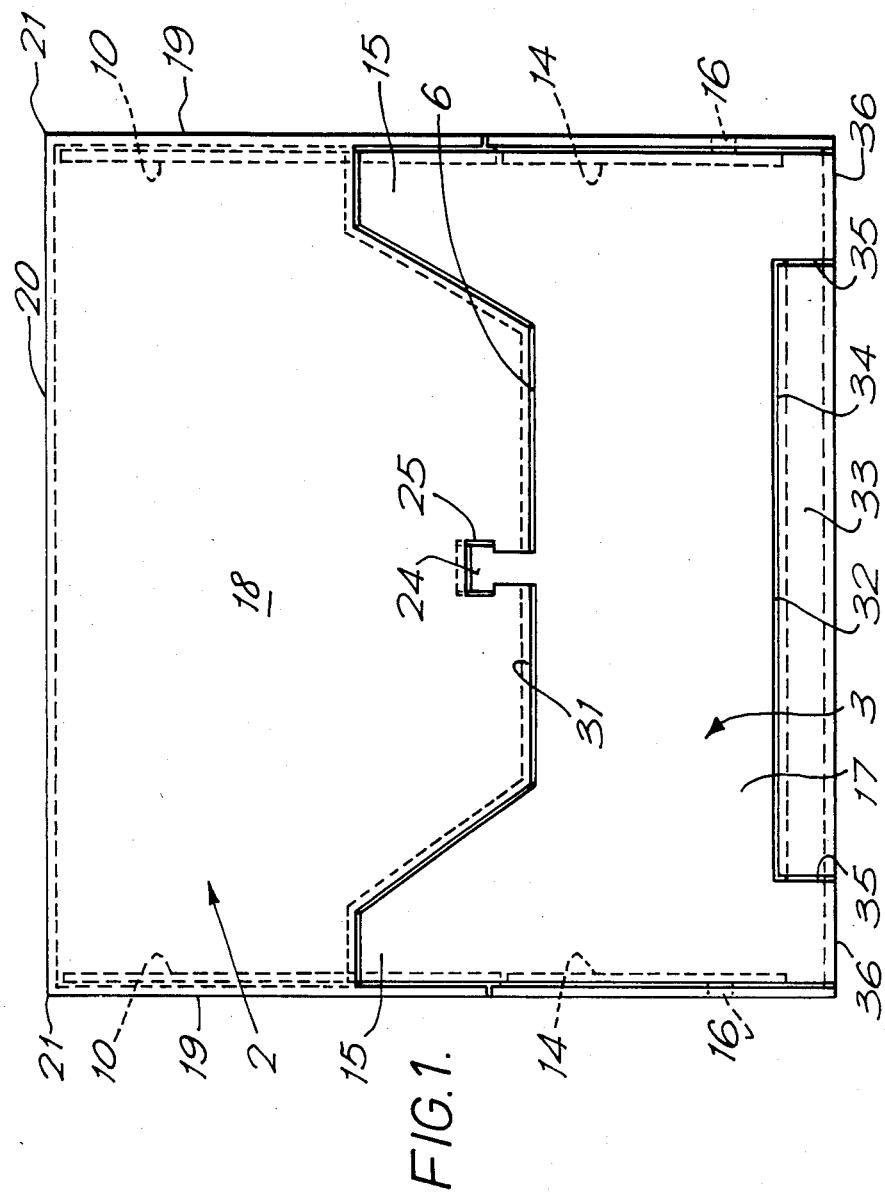
FIG. 1 is a plan view of a first embodiment of the box in its closed position.

Referring first to FIGS. 1 to 3 of the drawings, the first preferred box there shown comprises an inner part 1, an outer part 2 and a movable restraining member 3. Typically the inner part will be moulded of opaque, coloured plastics material; whilst the outer part and the restraining member will be moulded of clear plastics material.

The inner part 1 is L-shaped in lateral cross-section, as may be appreciated from FIG. 3, and has a front, foot or support member 4 and a stem or reaction member 5, the terms "support" and "reaction" being used in respect of the FIG. 3 disposition of the box. The foot and stem members 4,5 have a lateral extent slightly larger than that of a 5 ¼" floppy disk jacket and envelope; whilst the foot member 4 has a length extending from the stem member of approximately the thickness of a stack of ten such floppy disks and the stem member has a length extending from the support member of slightly larger than the length of such a floppy disk. Extending at right angles to the members 4,5 at both lateral edges are side members 7 which extend out from the junction of the members 4,5 to substantially the full length of the foot member 4 and the full length of the stem member 5. The remote corner 8 of each of the side members 7 is rounded. Each side member is stepped inwardly at an oblique step 9 extending from the stem, at approximately ⅓ of the length thereof from the foot member, and inclined at an angle α typically of 60° to the stem member away from the foot. In the stepped portion 10 of each side member remote from the foot member there extends a rebate 11 along the stem edge of the side member and a parallel groove 12 close to the rebate 11.

Between its step 9 and the foot member 5, each side member 7 has an aperture 13 at approximately half the width of the side member in the direction of the foot member.

The restraining member 3 is a flat member of rectangular shape save that it has a central trapezium cut-out 6 at one edge giving it two angled corners 15. From its lateral edges extend to one side of it wings 14 spaced to fit between the side members of the inner part. Each wing 14 is provided with a pin 16 for engaging in its aperture 13, the pins 16 being of substantially the same length as the thickness of the side members so as to have outer surfaces flush.

When the restraining member 3 is parallel with the stem member 5, the space between the members 3,5 is just sufficient for a stack of ten floppy disks FD with negligible compression of them. When the box is opened to the FIG. 3 disposition, the bottom portion 17 of the restraining member 3 is moved towards the stem member 5 causing the disks to be compressed at the level of their lower portions which are supported on the foot member 4. At the level of the pins 16, the disks remain substantially unrestrained; whilst at their upper portion the floppy disks fan out as shown in FIG. 3 in chain-dotted lines. Movement of the restraining member 3 is made possible on opening of the box as described in more detail below.

The outer part 2 has a cover panel 18, which covers the floppy disks space not covered by the restraining member 3 when the box is closed. From lateral edges of the cover panel extend side members 19 and from the rear edge extends a rear member 20 joined to the side members at rear corners 21. The side members 19 embrace the side members 7 of the inner part 1. In the closed position of the box, the free edge 22 of the rear member 20 abuts the free edge 23 of stem member 5 to enclose the floppy disks. The box is held closed by engagement of a lug 24 on the restraining member at the trapezium cut-out 14 in a corresponding small notch 25 in the cover panel 18. The latter is shaped to mate with the restraining member 3 at the trapezium cut-out 6, with the mating edges chamfered for engagement of the lug 24 in the notch 25 on closing movement of the outer part towards the restraining member as described below. The angle of chamfer is such that on closing the restraining member is deflected inwards and/or the cover panel outwards.

The outer-part side members 19, have forward ends 26 angled at 60° to mate with the oblique steps 9. Adjacent the ends 26, the side members 19 extend beyond the local extent of the cover panel 18, where the cover panel mates with the restraining member angled corners 15, so that the ends 26 can be slightly flexed outwardly. This enables circular pins 27 moulded on the inside of the side members 19 to be engaged into the grooves 12 which have closed outer ends 28. The side members also have parallelogram pins 29 and rectangular pins 30 moulded at the free edge thereof for accommodation in the rebates 11. The parallelogram pins 29 are slightly behind the circular pins 27 towards the rear member 20, whilst the rectangular pins 30 are still nearer the rear member 27.

To open the box, the restraining member 3 is depressed to disengage the lug 24 from the notch 25. The outer part can then be withdrawn, the inner part being drawn out. Initially this movement is parallel under the control of the pins 27,29,30 and the free edge of the side members 7 co-operating with groove 12 and rebate 11 and the inside surface of the cover panel 18. As the pins 27 approach the stop ends 28, the rounded corners 8 of the side members 7 clear the free chamfered edge 31 of the cover panel to allow the inner and outer parts to be swung until the pins 29 abut the rebates 11 on the side of the pins 27 nearest the foot member 4, with the parts arranged at 60°. The inner part 1 can then be moved back on itself at this inclination. During this movement, the chamfered free edge 31 of the cover panel 18 in the region of the notch 25 comes into sliding engagement with the under-side of the stem member 5. This engagement, in conjunction with the co-operation of the pins 27,29,30 with the groove 12 and rebate 11 determines the 60° inclination of the parts. The movement is stopped when the free edges of the side members come into abutment with the oblique steps 9, in the FIG. 3 position. At this position, the pins 27 have passed bumps 45 in the top of the grooves 12. Each bump is carried on a resilient arm 46 extending at the top of its groove 12 for a small part of its length towards the foot 4 with the bump on the foot end of the arm 46. The side-member portion 10 is slotted 47 at the arm 46 to allow the arm resilience in movement laterally of the groove 12. As the pins 27 pass the bumps 45 the arms deflect. When the pins pass the centre of the bumps they are urged against the ends 48 of the grooves, the pins still being contacted by the bumps as they abut the ends 48. Positive positioning of each pin laterally of its groove is provided by a small side portion 49 of the groove at the end 48 which is non-resilient.

Closing of the box is the reverse operation.

With the inner and outer parts in their FIG. 3, open position, the restraining member 3 can be pivoted about its pins 16. At the foot edge of the restraining member it has a rectangular cut-out 32, occupied in the closed position of the box by a rib 33 on the free edge of the foot member 4. The edge 34 of the rib 33 and the mating edge of the restraining member 3 are chamfered to allow the latter to pass under the rib on movement of the restraining member. At the lateral edges of the foot member 4, it has cut-outs 35, occupied by fingers 36 of the restraining member extending in the plane of the foot member 4, in the closed position. The free edges 37 of the fingers are chamfered.

As the restraining member is moved to fan out the floppy disks, the fingers 36 pass under the foot member 4 to abut the surface on which the box is supported. The corners 38 of the restraining member's wings 14 co-operate in an over-centre manner with bumps 39 on the stem member so that the restraining member is held open. The chamfered free edges 37 abut the foot member 4 and the chamfered edge of the restraining member 3 at the rectangular cut-out 31 abuts the inside of the foot member 4. This arrangement brings the forward edge 40 of the restraining member 3 into abutment with the surface 41 on which the box is stood, to steady the open box from tipping forwards. Both the restraining member 3 and the stem member 5 are inclined at a steep inclination $\beta,\gamma$ typically of 80°-75°, to the surface 41 with the points of contact 40,42 spaced substantially equally about the centre of gravity of the fanned disks. In the preferred embodiment, the restraining member 3 is inclined at 78° and the stem member 5 at 75°. Thus the rearwards spacing of the box's centre of gravity helps to ensure stability.

Variant of the First Preferred Embodiment

In a modification of the first embodiment, illustrated in FIGS. 4 and 5, in order to control the outer and inner parts to remain parallel until the rounded remote corners 8 of the side members 7 of the inner part 1 clear the free chamfered edge 31 of the cover panel 18, on initial opening of the box, the pins 29 and 30 are replaced by a continuous rib 50 extending between the positions of the pins 20 and 30 as described in relation to the first embodiment. One such rib is provided on the inside edge of each side member 19 of the outer part 2 to engage in the rebate 11 of the side member 7.

For better control of the relative disposition of the outer and inner parts in the open position of the box, the pins 27 on the inside of the side members 19 of the outer part 2 are arranged to abut neither the ends 48 nor the small side portions 49 of the grooves 12. Rather the bumps 45 remain in contact with the pins 27 and urge the free edges of the side members 19 of the outer part 2 into contact with the steps 9 in the side members 7 of the inner part 1.

Resilience for the bumps 39 formed on the inside of the stem member 5 is provided by a right angle U-shaped groove 90 in the outer surface of the stem member 5. Each bump 39 is positioned at the closed end of the U of its groove 90, and preferably in one corner of the U, as shown. The U-shaped grooves are deepest at their cross part 91 close to the bumps 39 and taper out in their parallel parts 92 which are directed towards the foot member 4. The deep portions of the grooves provide a thinning of the material of the stem member 5, which enhances the resilience thereof in the vicinity of the bumps 39.

The Second Preferred Embodiment

Figure 6:
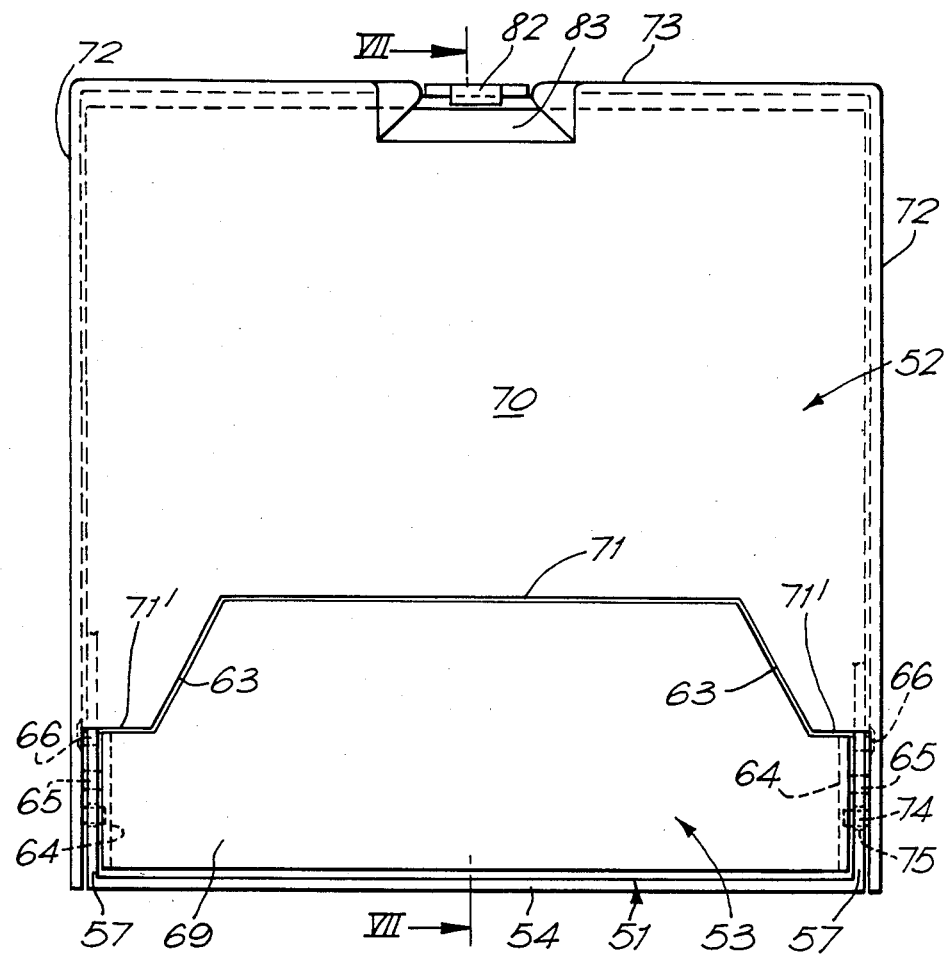
FIG. 6 is a plan view of a second embodiment of the box in its closed position.
Figure 10:
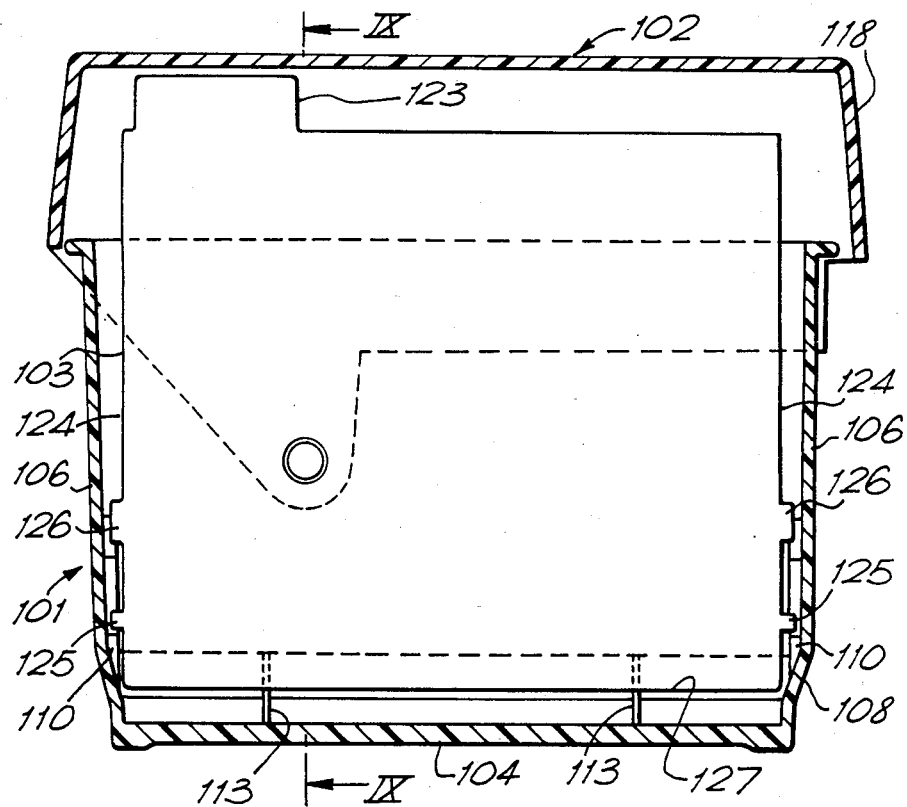
FIG. 10 is a cross-sectional end elevation of the box on lines X—X in FIG. 9.
Figure 12:
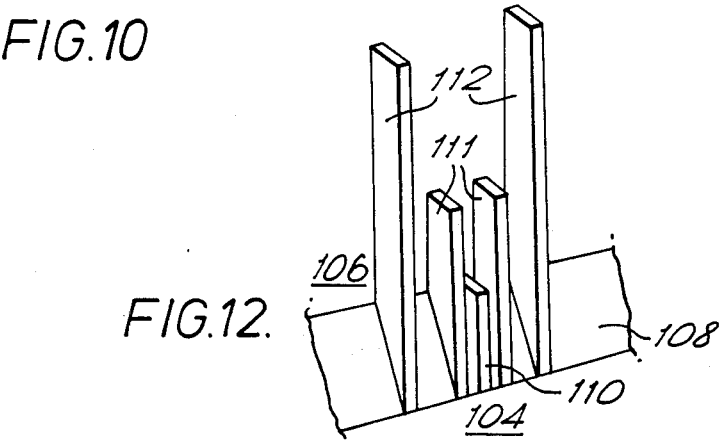
FIG. 12 shows a perspective view of a divider support at the foot of the inside of a side wall of the box of FIG. 9.

Referring to FIGS. 6,7 and 8, the second preferred box there shown comprises a tray 51, a cover 52 and a movable restraining member 53. Typically the tray will be moulded of opaque, coloured plastics material; whilst the cover and the restraining member will be moulded of clear plastics material.

The tray 51 is L-shaped in cross-section, as shown in FIG. 8, and has a foot or support member 54 and a stem or reaction member 55, the terms "support" and "reaction" being used in respect of the FIG. 8 disposition of the box. The foot and stem members 54,55 have a lateral extent slightly larger than that of a 5¼" floppy disk jacket and envelope; whilst the foot member 54 has a length approximating to the thickness of a stack of ten such floppy disks and the stem member has a height slightly larger than the height of such a floppy disk. As may be seen in FIG. 6, the foot member 54 and the stem member 55 are set at 75° to each other save that the foot member 54 has a small toe or edge portion 56 at 90° to the stem member 55. Extending at right angles to the members 54,55 at both lateral edges are flanges 57 which extend out from the junction of the members 54,55 to the edge portion 56 and approximately half the height of the stem member 55. The free edge 58 of each flange 57 has a shallow step 59 and a tapering end portion 60.

Each wing 57 has an aperture 61 adjacent the free edge 58 and an arcuate slot 62 centred on the aperture 61 and on the opposite side of it from the foot member 54.

The restraining member 53 is a flat member of rectangular shape save that it has trapezium cut-outs at two corners giving it two angled corners 63. From its lateral edges extend to one side of it wings 64 spaced to fit between the flanges 57 of the tray 51. Each flange 57 is provided with a pair of pins 65,66 for engaging in the aperture 61 and the slot 62, the pins 65 being of substantially the same length as the thickness of the flanges 57 so as to have outer surfaces flush; whilst the pins 66 are longer to extend through the slots 62 and stand proud of the outer surface of the flanges.

When the restraining member 53 is parallel with the stem member 55, the pins 66 are at the inner ends 67 of the slots 62, see FIG. 5. The space between the members 53,55 is just sufficient for a stack of ten floppy disks FD with negligible compression of them. When the box is opened to the FIG. 6 disposition, the pins 66 move to the outer ends 68 of the slots 62; the bottom edge 69 of the restraining member 53 is moved towards the stem member 55 causing the disks to be compressed at the level of their lower portions which are supported on the foot member 54. At the level of the pins 65, the disks remain substantially unrestrained; whilst at their upper portions the floppy disks fan out as shown in FIG. 6 in chain-dotted lines. Movement of the restraining member 53 is caused by cooperation between the pins 66 and the cover 52, as described below.

The cover 52 has a top panel 70 having an edge 71 shaped to fit the edge of the restraining member 53, including its angled corners 63. Both the edge 71 and the edge of the restraining member are complementarily chamfered, bearing in mind that, as described below, the initial opening action is a lifting of the cover 52 away from the tray 51 and the restraining member 53.

The cover 52 has opposite sides 72 and an end 73. Each side has an aperture 75 for a pin 74 extending out from the flanges 57 of the tray, providing pivotal connection between the tray 51 and the cover 52. It will be noted that the sides 72 of the cover 52 at one end follow the shape of the foot and stem members 54,55 of the tray, except that the triangular space 76 shown in FIG. 5 resulting from these members 54,55 being at 75° is squared off by the sides 72 at their corners 77.

The action of opening of the box from its FIG. 5 position comprises grasping of the tray 51 at its portion 78 opposite the restraining member 53 and of the restraining member itself; lifting of the cover 52 about the pivot pins 75; swinging of the tray 51 to its FIG. 6 position, a movement of 75°; swinging on around of the cover 52 by an additional 285° —making 360° in all—to its FIG. 6 position. During the last stage of the swinging of the cover, the ends of the sides 72 adjacent the corners 77 come into contact with the pins 66 forcibly moving the restraining member 53 to its position compressing the lower portions of the floppy disks. In the open FIG. 8 position, the free edges of the sides 72 are coplanar with the outer surface of the foot member 54 for flat support of the box on a support surface, not shown. Collapse backwards of the tray 51 is prevented by co-operation between its rear surface and short outer portions 71' of the edge 71 of the top panel 70 adjacent the sides 72. The portions 71' are parallel to the central part of the edge 71 and spaced from it by angled portions.

Closing of the box is effected in the reverse sequence. On closing, the pins 66 are prevented from abutting the sides 72 by riding up ramps 79 provided inside the sides 72. The pins 66 then slide over the inner surface of the sides and spring out into recesses 80 provided therein at the boxclosed position of the pins. This action tends to close the restraining member 53 into its position parallel to the top panel 70. Final closure of the restraining member is ensured by co-operation of the edge 71 of the top panel and the corresponding edge of the restraining member. "Over-closing" is prevented by co-operation of the pins 66 with the ends 67 of the slots 62. "Over-closing" of the top cover 52 is prevented by co-operation of the inside of the top panel 70 with the shallow steps 59 of the wings 57 of the tray. At the edge of the tray remote from the restraining member and at the corresponding edge of the end 73 of the cover 72 are provided complementary catch formations 81,82. These are disengaged for opening by pressure in a recess 83 in the end 73. It should be noted that the recess has an inner portion 84 shaped parallel to the foot member 54 in the closed FIG. 7 position, whereby they co-operate to give the stored floppy discs a slightly sheared stack arrangement both when the box is closed as well as when it is open.

The Third Preferred Embodiment

Referring to FIGS. 9 to 12 of the drawings, a third preferred box, which is of moulded plastics material, comprises a tray 101, a cover 102, and a plurality of movable dividers 103.

The tray 101 has a base 104 whose upper surface supports the lower edges of 5¼" floppy disks FD arranged in a series of six substantially upright stacks—of which only one representative stack with the disks represented by chain-dotted lines is shown. The tray has two side walls 106, spaced according to the width of the disks, and two end walls 107 spaced according to the thickness of sixty disks and five dividers 103—with the disks normally being negligibly compressed when the box is full.

Along the feet of the side walls 106 and the end walls 107, there is provided a shallow portion 108 tapering outwards and upwards with a 15° taper to the vertical and above this the walls have a usual draft taper of 1½°. Inside each of the side walls 106 there extend up from the base 104 and tapered portion 108 sets of supports for the dividers 103. Five, equally spaced such sets of supports are provided per side. As shown in detail in FIG. 12, each set of divider supports comprises five upstanding ribs 110,111,112. The central rib 110 extends from the base 104 to the height of the tapered portion 108. The intermediate ribs 111 extend somewhat higher, whilst the outer ribs 112 extend higher still.

The end walls 107 each have a pair of ribs 113 extending at 45° from the base to the top of the tapered portion 108. One of the end walls has downwardly open handle formation 114 which has in its upper surface an aperture 115 for a lock hook. Each end wall has an aperture 116 for a lid pivot pin 117.

The cover 102 is a flat panel with a depending lip 118 shaped to overlap the top edge of the side and end walls 106,107. The lip 118 includes a portion 119 shaped complementarily with the handle portion 114. This portion houses a lock 120 and includes a rib 121 positioned to abut the top of the handle portion 114 for control of the closed position of the cover. At the ends of the box, the lip 118 extends down in ears 122 to the level of apertures 116 to support the lid pivot pins 117.

The movable dividers 103 are rectangular sheets having index tabs 123 positioned whereby the tabs on the individual dividers are differently positioned laterally of the box. At each edge 124 the dividers have two protrusions 125,126. The lower protrusions 125 are pivot pins advantageously having a thickness greater than the mean sheet thickness of the dividers. These pivot pins 125 are supported between the ribs 111 of respective divider supports 109 and on top of their ribs 110. The pins 125 are so spaced from the bottom edges 127 of the dividers and the tops of the ribs 110 are so spaced from the base 104, that the bottom edges 127 of the dividers are clear of the base. The upper protrusions 126 are captive between the outer ribs 112, so that the range of angular pivoting available to the dividers is restricted.

If a floppy disk between a particular pair of dividers 103 is required, pivotal movement of one and preferably both of the dividers—via pressure on their tabs 123—away from the intervening stack of floppy disks causes them to be compressed at their lower portions, i.e. below the level of the pivot pins 125 by mutual approach of the bottom edges 127 of the dividers. This compression causes the floppy discs to fan out at their upper portions whereby a required one can easily be found, selected and removed for use. It should be noted that such movement of the dividers compresses the upper portion of floppy disks in others of the six stacks of them; but they are sufficiently resilient to permit this. Where a disk is to be removed from an end stack only one divider is moved and the compression of the lower portion will be between the corresponding divider and the end wall ribs 113.

It will be appreciated that, when one divider 103 is moved, so that its lower part bears against the lower portion of an outside one of the stack of disks for compression of them, the divider 103 on the other side of the stack, or the end wall ribs 113, as the case may be, acts as a reaction member to bear against the lower portion of an outside one of the stack of disks at the other side. If both dividers 103 on either side of a stack are so moved, then both act as compression and reaction members.

The invention is not intended to be restricted to the details of the above described embodiments. For instance, for the first embodiment, other over-centre means may be provided for retaining the box parts in their open position. The bumps 45 can be replaced by bumps in the bottom of the grooves 12 and the bumps 39 can be replaced by bumps at the cut-outs 35 co-operating with the fingers 36.

I claim:
1. a box in combination with thin objects, comprising:
a plurality of thin objects forming a stack capable of fanning out at their top portions from being compressed at their lower portions
means supporting said stack of said objects in a substantially upright position for selection amongst them, said support means including a support surface disposed beneath said objects at least when said stack is arranged substantially upright;
means for compressing said stack of thin objects at the level of lower portions thereof to cause them to fan out at upper portions thereof, said compression means including:
a movable member spaced from and movable crosswise of said support surface to bear at one side of said stack against an outside one of said stack of objects for compression of them, and
a reaction member positioned to bear at the other side of said stack against an outside one of said stack of objects for reacting said compression of said objects caused on movement of said movable member, a lower portion of said movable member moves toward said reaction member to decrease the distance therebetween and compress said objects.

2. A combination according to claim 1, wherein said movable member includes means for pivoting said movable member in said box for movement into a compression position compressing said lower portions of said objects.

3. A combination according to claim 1, wherein said compression means is so arranged that said stack of objects is restrained without further compression at a level intermediate said upper - fanned - and said lower - compressed - portions of said thin objects to provide a fulcrum level about which said objects fan out.

4. A combination according to claim 3, wherein said movable member includes means for pivoting said movable member in said box for movement into a compression position compressing said lower portions of said objects and said pivot axis of said movable member is arranged at said fulcrum level, whereby said compression means provides such restraint without further compression of said objects at this level.

5. A combination according to claim 4, wherein said box has two fixed end walls, two fixed side walls, a base integral with said walls, and at least one movable divider pivotally carried on and extending between said side walls, said base providing said support surface, said movable divider providing said movable member and one of said end wall and said movable divider providing said reaction member.

6. A combination according to claim 1, wherein said box includes an outer part and an inner part connected to said outer part, said outer part covering said objects in a closed position of said box and supporting said inner part at a leaning back inclination in an open position of said box.

7. A combination according to claim 6, wherein said inner part is generally L-shaped in lateral cross-section, having a foot member and a stem member, said foot member providing said support surface, and said stem member providing said reaction member.

8. A combination according to claim 6, wherein said reaction member and said movable member are substantially equally and oppositely inclined when said box is stood in its open position on a support surface.

9. A combination according to claim 6 including engagement means for connecting together said inner part and said outer part so as to allow said inner part to be at least partially withdrawn from said outer part to a position whence said inner part can be swung through an angle of less than 180° with respect to said outer part for movement of said box into a self-supporting, open position, in which a rear lower edge of said outer part and a rear lower edge of said inner part can abut a supporting surface.

10. A box for storing thin objects, said box comprising:
an L-shaped in lateral cross-section inner part having a foot member disposed beneath said objects for substantially upright support thereof when said box is open, a stem member arranged behind said objects when said box is open, and side members extending between said foot member and said stem member at each side of said inner part;
an outer part having a cover panel for closing said inner part when said box is closed and side members extending at each side of said cover panel;
each of said side members of said inner part having an oblique step in an outer surface, behind which a respective one of said side members of said outer part is accommodated and against which this said side members of said outer part abuts when said box is open, a rebate at a lower edge thereof and a groove parallel to said rebate, said rebate and said groove extending behind said step, and a resilient detent at a forward end of said groove;
each of said side members of said outer part having a pin for engaging in a respective one of said grooves and a rib at a bottom edge of said side member for accommodation in said rebate;
said grooves and said pins interconnecting said inner part and said outer part when said box is closed and when said box is open with said resilient detents biassing said pins for abutment of said side members of said outer member against said steps and said forward end of said ribs abutting said side members of said inner part in said rebates at said steps with a rear lower edge of said outer part and a front lower edge of said inner part abutting a support surface;
said box including a movable member, which is coplanar with said cover panel when said box is closed, and side wings at each side of said movable member;
said movable member and said cover panel having complementary chamfered edges and catch formations;
said side wings having pins and being spaced to fit between said side members of said inner part; and
said side members of said inner part having apertures for accommodating said pins, said pins and said apertures defining an axis of pivotal connection of said movable member to said inner part above said foot member when said box is open such that a bottom part of said movable member is movable cross-wise of said foot member to compress lower portions of said thin objects between itself and said stem member to cause said thin objects to fan out at upper portions thereof;
said bottom part of said movable member has a cut-out and fingers extending rearwardly of said movable member;
said foot member has a rib occupying said cut-out and additional cut-outs occupied by said fingers when said box is closed, said fingers abutting an outside of said foot member when said box is open to limit pivotal movement of said movable member.

11. A box for storing thin compressible objects, comprising:
an outer part and an inner part connected to said outer part, said outer part covering said objects in a closed position of said box and supporting said inner part at a leaning back inclination in an open position of said box;
means for supporting a stack of said objects in a substantially upright position for selection amongst them, said support means including a support surface disposed beneath said objects at least when said stack is arranged substantially upright;
means for compressing said stack of thin objects at the level of lower portions thereof to cause them to fan out at upper portions thereof, said compression means including:
a reaction member positioned to bear at one side of said stack against an outside one of said stack of objects, and
a movable member spaced from and movable cross-wise of said support surface to bear at the other side of said stack against an outside one of said stack of objects for compression of them, said movable member having side wings, said side wings of said movable member including means for pivoting said movable member to said inner part for movement into a compression position compressing said lower portions of said objects between said movable and reaction members; said inner part having pair of side members adjacent said side wings; pivotal limitation means operatively connecting said side wings and said inner part for limiting forwards pivotal movement of said movable member to said compression position.

12. A box according to claim 11, wherein said pivotal limitation means comprises an abutment on said movable member and a stop on said inner part.

13. A box according to claim 11, including detents on said inner part, with which said side wings of said movable member cooperate in an over-centre manner in said compression position.

14. A box according to claim 13 wherein each said detent is formed as a bump on said reaction member, with a U-shaped groove in said reaction member for providing resiliency for said bump.

15. A box according to claim 11, wherein said inner part has a respective pin extending from each of side members thereof and said outer part has a respective aperture in each of side members thereof, said pins and said apertures pivotally connecting said inner and outer parts so as to allow said outer part to be swung through an angle of more than 270° with a respect to said inner part for movement of said box into an open positions, in which said outer part extends behind said inner part for support of it in its leaning back open position with said outer part on a supporting surface.

16. A box for storing thin compressible objects, comprising
an outer part and an inner part connected to said outer part, said outer part covering said objects in a closed position of said box and supporting said inner part at a leaning back inclination in an open position of said box;
means for supporting a stack of said objects in a substantially upright position for selection amongst them, said support means including a support surface disposed beneath said objects at least when said stack is arranged substantially upright;
means for compressing said stack of thin objects at the level of lower portions thereof to cause them to fan out at upper portions thereof, said compression means including:
a movable member spaced from sand movable crosswise of said support surface to bear at one side of said stack against on outside one of said stack ob objects for compression of them causing them to fan out and
a reaction member positioned to bear at the other side of said stack against an outside one of said stack of objects for reacting said compression of said objects caused on movement of said movable member, said outer part having a cover panel which—in said closed position—is co-planar with said movable member and said cover panel and movable member having chamfered edges at which they abut in said closed position.

17. A box for storing thin compressible objects, comprising:
an outer part and an inner part connected to said outer part, said outer part covering said objects in a closed position of said box and supporting said inner part at a leaning back inclination in an open position of said box;
engagement means for connecting together said inner part and said outer part so as to allow said inner part to be at least partially withdrawn from said outer part to a position whence said inner part can be swung through an angle of less than 180° with respect to said outer part for movement of said box into a self-supporting, open position, in which a rear lower edge of said outer part and a rear lower edge of said inner part can abut a supporting surface;
means for supporting a stack of said objects in a substantially upright position for selection amongst them, said support means including a support surface disposed beneath said objects at least when said stack is arranged substantially upright;
means for compressing said stack of thin objects at the level of lower portions thereof to cause them to fan out at upper portions thereof, said compression means including:
a movable member spaced from an movable crosswise of said support surface to bear at one side of said stack against an outside one of said stack of objects for compression of them, said movable member including means for pivoting said movable member in said box for movement into a compression position and an axis of said pivot means connecting said movable member to said inner part is so positioned that a forward edge of said movable member can abut said supporting surface, when the movable member is moved to said compression position; and
a reaction member positioned to bear at the other side of said stack against an outside one of said stack of objects for reacting said compression of said objects caused on movement of said movable member.

18. A box for storing thin compressible objects, comprising:
an outer part and an inner part connected to said outer part, said outer part covering said objects in a closed position of said box and supporting said inner part at a leaning back inclination in an open position of said box;
engagement means for connecting together said inner part and said outer part so as to allow said inner part to be at least partially withdrawn from said outer part to a position whence said inner part can be swung through an angle of less than 180° with respect to said outer part for movement of aid box into a self-supporting, open position, in which a rear lower edge of said outer part and a rear lower edge of said inner part can abut a supporting surface;
means for supporting a stack of said objects in a substantially upright position for selection amongst them, said support means including a support surface disposed beneath said objects at least when said stack is arranged substantially upright;
means for compressing said stack of thin objects at the level of lower portions thereof to cause them to fan out at upper portions thereof, said compression means including:
a movable member spaced from and movable crosswise of said support surface to bear at one side of said stack against an outside one of said stack of objects for compression of them, said movable member including means for pivoting said movable member in said box for movement into a compression position and an axis of said pivot means connecting said movable member to said inner part is so positioned that a forward edge of said movable member can abut said supporting surface, when the movable member is moved to said compression position;
pivotal limitation means for limiting forward pivotal movement of said movable member to said compression position; a forward edge of said movable member having a cut-out and fingers extending rearwardly of said pivotal limitation means; said support surface having on a forward edge thereof a rib occupying said cut-out in said closed position of said box and additional cut-outs occupied by said fingers in said closed position; and
a reaction member positioned to bear at the other side of said stack against an outside one of said stack of objects for reacting said compression of said objects caused on movement of said movable member.

19. A box according to claim 17, wherein said outer part has a cover panel which - in said closed position - is co-planar with said movable member and said cover panel and said outer part have chamfered edges at which they abut in said closed position; and said cover panel and said movable member are formed with cooperating catch formations.

20. A box for storing thin compressible objects, comprising:
- an outer part and an inner part connected to said outer part, said outer part covering said objects in a closed position of said box and supporting said inner part at a leaning back inclination in an open position of said box, said inner part having a pair of side members, said outer part having a pair of side members;
- said inner part having means for supporting a stack of said objects in a substantially upright position for selection amongst them, said support means including a support surface disposed beneath said objects at least when said stack is arranged substantially upright;
- means for compressing said stack of thin objects at the level of lower portions thereof to cause them to fan out at upper portions thereof, said compression means including:
- a movable member spaced from and movable crosswise of said support surface to bear at one side of said stack against an outside one of said stack of objects for compression of them said movable member having a pair of side wings, said side wings of said movable member each having first and second pins,
- a reaction member on said outer part positioned to bear at the other side of said stack against an outside one of said stack of objects for reacting said compression of said objects caused on movement of said movable part,
- said side members of said inner part each having an aperture for pivotal accommodation of a respective one of said first pins and a slot arcuate about said aperture for pivotal accommodation of one of said second pins to provide pivotal limitation of said movable member in said compression position by abutment of said second pins against ends of said slots; and said side members of said outer part each having on an inner surface a ramp at a lower edge for guiding a respective one of said respective second pins to pass over said inner surface on closing of said box and a recess for accommodating said respective second pins when said box is closed.

21. A box for storing thin compressible objects, comprising
- two fixed end walls,
- two fixed side walls,
- a base integral with said walls, for supporting a stack of said objects in a substantially upright position for selection amongst them, said base including a support surface, disposed beneath said objects at least when said stack is arranged substantially upright;
- means for compressing said stack of thin objects at the level of lower portions thereof to cause them to fan out at upper portions thereof, said compression means including:
- a movable divider pivotally carried on and extending between said side walls, to bear at one side of said stack against an outside one of said stack of objects for compression of them, said movable divider including means for pivoting said divider in said box for movement into a compression position compressing said lower portions of said objects said pivoting means including each side wall having respectively for said divider a central upstanding rib, two higher upstanding ribs neighboring said central rib on opposite sides and two further yet higher upstanding ribs neighboring said higher ribs on opposite sides; and said divider having a pivot point, supportable on said central ribs and laterally captive between said higher ribs, and a pivotal limitation point laterally captive between said further ribs, and
- a reaction member positioned to bear at the other side of said stack against an outside one of said stack of object for reacting said compression of said objects caused on movement of said movable divider.

22. A box according to claim 21, wherein said reaction member is a second movable divider including second means for pivoting said second divider in said box for movement into a compression position compressing said lower portions of said objects, said second pivoting means including each side wall having respectively for said second divider a central second upstanding rib, two higher upstanding second ribs neighboring said central second rib on opposite sides and two further yet higher upstanding second ribs neighboring said higher second ribs on opposite sides; and said divider having a pivot point, supportable on a respective one of said central rib and laterally captive between said higher ribs, and a pivotal limitation point laterally captive between said further ribs.

23. A box for storing thin compressible objects, comprising:
- two fixed end walls,
- two fixed side walls,
- a base integral with said walls for supporting a stack of said objects in a substantially upright position for selection amongst them, said base including a support surface, disposed beneath said objects at least when said stack is arranged substantially upright;
- means for compressing said stack of thin objects at the level of lower portions thereof to cause them to fan out at upper portions thereof, said compression means including:
- a movable divider pivotally carried on and extending between said side walls to bear at one side of said stack against an outside one of said stack of objects for compression of them, said movable divider including means for pivoting said divider around a pivot axis in said box for movement into a compression position compressing said lower portions of said objects and said pivot axis of said movable divider is arranged at a fulcrum level, whereby said compression means provides such restraint without further compression of said objects at this fulcrum level, and
- a reaction member position to bear at the other side of said stack against an outside one of said stack of objects for reacting said compression of said objects caused on movement of said movable divider,
- at least one of said end walls having ribs acting as the said reaction member.

* * * * *